Dec. 20, 1966   J. A. HERRMANN ETAL   3,293,503
PANELBOARD ASSEMBLY WITH SIDE MOUNTED SUPPORT
MEANS AND LINE TERMINALS ACCESSIBLE FROM REAR
Filed June 5, 1964                                4 Sheets-Sheet 1

INVENTORS
JOHN A. HERRMANN
RUSSELL S. DAVIS
WARREN C. RAUHAUSER
By OSTROLENK, FABER, GERB & SOFFEN
ATTORNEYS

Dec. 20, 1966 J. A. HERRMANN ETAL 3,293,503
PANELBOARD ASSEMBLY WITH SIDE MOUNTED SUPPORT
MEANS AND LINE TERMINALS ACCESSIBLE FROM REAR
Filed June 5, 1964 4 Sheets-Sheet 2

INVENTORS
JOHN A. HERRMANN
RUSSELL S. DAVIS
WARREN C. RAUHAUSER
BY
OSTROLENK, FABER, GERB & SOFFEN
ATTORNEYS

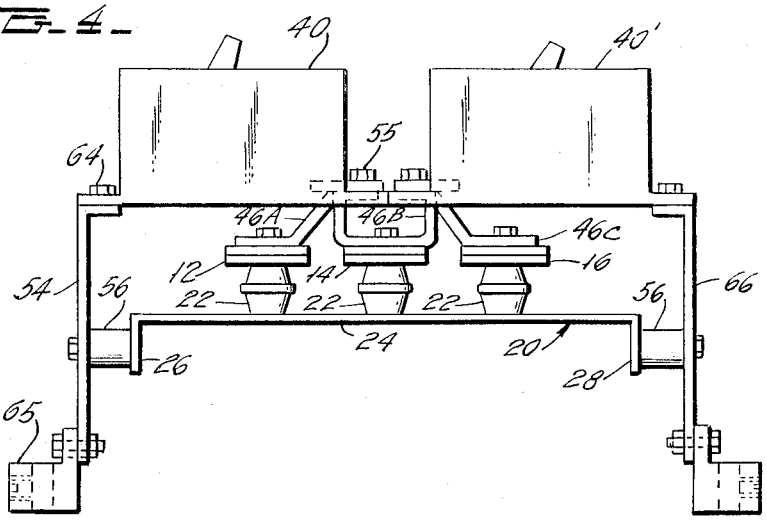
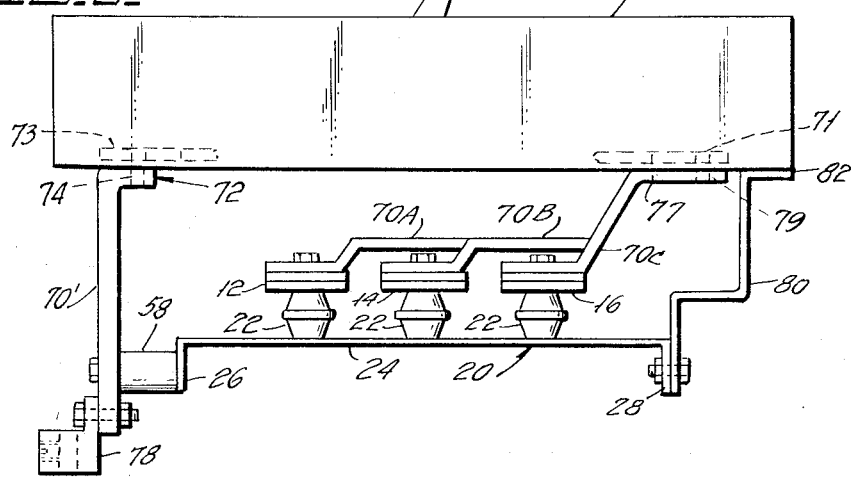
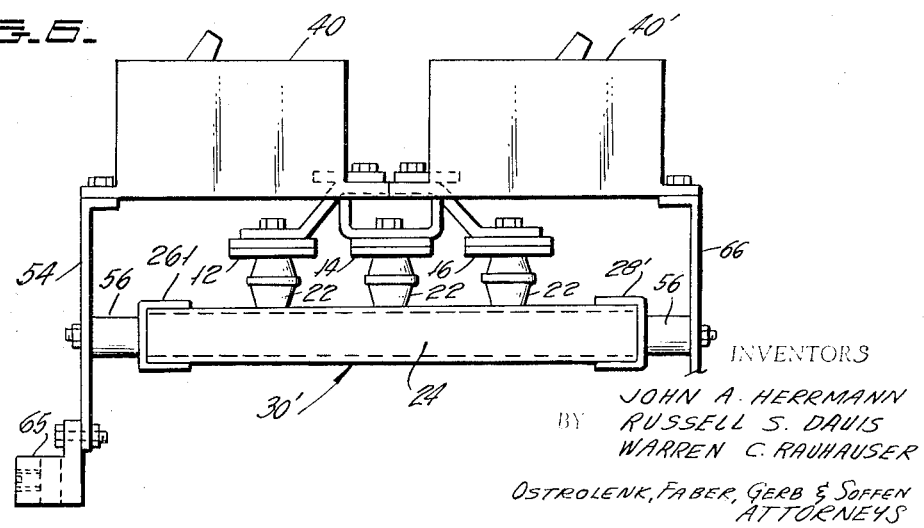

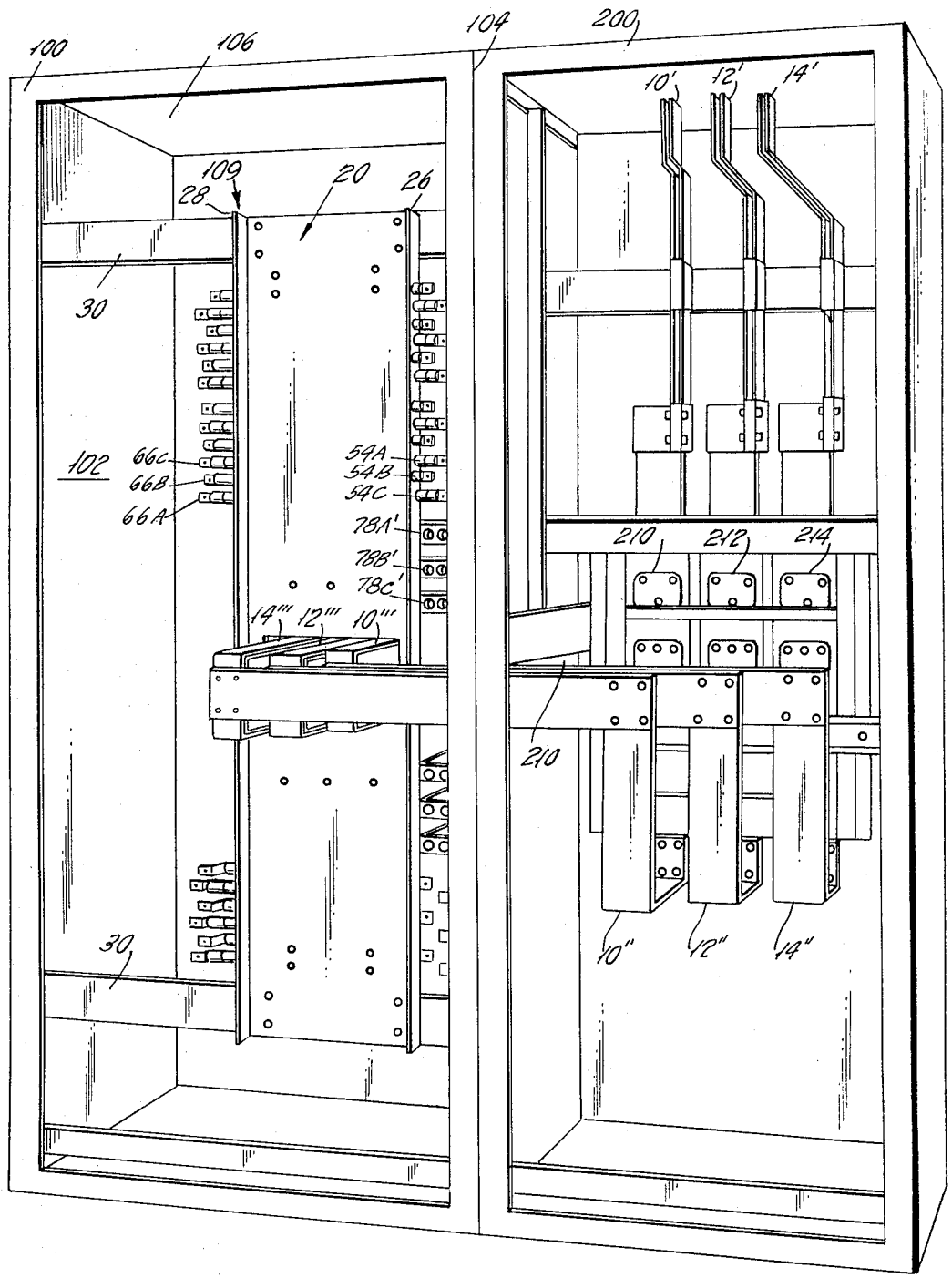

3,293,503
PANELBOARD ASSEMBLY WITH SIDE MOUNTED SUPPORT MEANS AND LINE TERMINALS ACCESSIBLE FROM REAR
John A. Herrmann, Grosse Pointe Farms, and Russell S. Davis and Warren C. Rauhauser, Detroit, Mich., assignors to I-T-E Circuit Breaker Company, Philadelphia, Pa., a corporation of Pennsylvania
Filed June 5, 1964, Ser. No. 372,891
6 Claims. (Cl. 317—119)

Our invention relates to an arrangement for installing circuit breakers to a panelboard assembly, and more particularly to an arrangement which allows the circuit breaker load terminals to be bussed to an external circuit from the rear of the panelboard in such a manner that individual circuit breakers may be removed from the front of the panelboard without disturbing the rear bus connections.

It is well known to provide a panelboard assembly for interconnecting a source of electricity to a plurality of external circuits, with the external circuits being protected by individual circuit breaker units. Such panelboards typically include an arrangement of longitudinally extending bus means, with the circuit breaker units being mounted in side-to-side adjacent arrangement along the longitudinal extent of the panelboard. The individual line terminals of the circuit breaker units are electrically connected to the bus means. Likewise, the load terminals of the individual circuit breaker units are connected to the external circuits to be protected via individual load bus. Heretofore the connections of the load terminals to the external circuit have been principally obtained from the forward surface of the panelboard and have necessitated disturbance of the load connection to permit removal and/or replacement of individual circuit breaker units. Further, it has been found that a substantial simplification in the load bus runs may be effected by their connection to the rear portion of the panelboard assembly. It is accordingly a principal object of our invention to provide a panelboard assembly wherein the bus connections to the load side of the circuit breakers are externally accessible from the rear of the panelboard assembly, while permitting the installation of the circuit breaker units themselves to the front surface of the panelboard without disturbing the previously established rear bus work.

A typical prior art arrangement of bussing the load terminals from the front of the panelboard is shown in U.S. Pat. No. 2,942,157, issued June 21, 1960, in the name of R. S. Davis, entitled "Mounting Arrangement for Plug-In Type Panelboard," and assigned to the assignee of the instant invention. The load terminals of that patent are so located as to require all load connections to be made from the forward surface of the panelboard and over the edge of the board. This complicates the load bus runs from the panelboard assembly to the external circuits, as well as requiring the disconnection of the load bus for circuit breaker removal.

Another prior art arrangement utilizes Bakelite plates to attach the circuit breaker units to the panelboard frame, in conjunction with studs which are bolted to the circuit breaker terminals and to which the line and load bus are attached at the opposite end. Such connecting studs require expensive threading, and since they are not rigidly positioned by the Bakelite plates have been found to provide considerable difficulty in circuit breaker installation and alignment.

Other prior art arrangements contemplate the use of special molded parts bolted to a steel support plate. One portion of the special molding carries studs to which the line and load bus are attached, while the other end has provision for tulip-type plug-in connectors, so as to permit the circuit breakers to be removed without disturbing the bus work. The use of such special moldings, additional steel support plates and tulip-type plug-in connectors involves a considerable expense, as well as a bothersome mounting procedure.

Our invention avoids these complex, cumbersome and expensive arrangements of the prior art in a manner providing increased accessibility of terminal locations as well as substantial simplification of the circuit breaker mounting and load bus connections.

Briefly stated our invention contemplates the utilization of a longitudinally extending main frame support to which the bus means are rigidly secured. A first and second conducting strap is provided at each of the positions along the length of the panelboard corresponding to the reception of a pair of circuit breaker line and load terminals. The first conducting strap is electrically connected at one of its ends to the appropriate bus means, with its other end forwardly projecting to a location in registry with the line terminal of the circuit breaker unit to be installed. The second conducting means is also rigidly mounted, via an insulator post, to the main frame support and includes a forwardly projecting portion, in alignment with the forwardly projecting portion of the first conducting strap and suitably adapted to register with the load terminal of the circuit breaker to be mounted. The other end of the second conducting strap rearwardly extends to be readily accessible from the rear of the panelboard assembly, and includes an appropriate terminal for electrical connection to the load bus of its respective circuit. The circuit breaker unit is electrically connected to the forwardly extending portions of these first and second conducting straps, from the forward surface of the panelboard, and such connection is in completely unobstructed relationship with respect to rearwardly extending portion of the circuit breaker load terminal strap.

As a further advantageous aspect of our invention, the forwardly extending portions of the line and load terminal conducting straps include a planar portion which abuttingly mate with rear surface of the circuit breaker to be mounted. This abutting relationship provides the prime mechanical support means for rigidly mounting the circuit breaker to the panelboard assembly, thereby avoiding the additional expense and complexity of frame extensions and support brackets which had heretofore been necessary.

One arrangement for mounting circuit breakers in accordance with the basic objectives of our invention contemplates an adjacent pair of circuit breakers across the width of the panelboard. The load terminal strap for one of the circuit breaker pairs is mounted to one edge of the frame support, with the load terminal support strap for the complementary circuit breaker unit being mounted along the opposite edge of the frame support. The line terminals of the circuit breakers lie along the central portion of the panelboard, with the respective line conducting strap being appropriately shaped for independently receiving the line terminals of each of the pair of circuit breakers.

In another arrangement the circuit breaker may be of a frame size requiring substantially the entire width of the panelboard. If so, the load conducting strap is mounted to one of the edges of the frame support and serves to support the load end of the circuit breaker. To further assist in supporting the line end of the circuit breaker, an additional support bracket, if desired, may be mounted to the other edge of the frame support.

In numerous applications the power requirements of the many external circuits to be connected to the bus means are not uniform, and often require various frame sizes of circuit breakers within a single panelboard. If so, portions of the panelboard may include pairs of smaller frame circuit breakers, while other portions of the panelboard may include a single circuit breaker across the width of the panelboard. The fabrication of our panelboard to accommodate such different size circuit breakers may be easily accomplished by mounting different configurations of the line and load terminal straps along different portions of the panelboard assembly. In both arrangements, however, the load bus is rearwardly accessible and preferably contains mounting terminals in a neat vertical line, thereby simplifying the bus runs and facilitating in-field modifications.

It is therefore seen that the basic concept of our invention resides in providing a simplified panelboard assembly, wherein the load terminals may be bussed from the rear of the panelboard in a manner permitting circuit breaker replacement from the front of the panelboard without disturbing the rear bus work.

Accordingly, a primary object of our invention is to provide a novel panelboard of simplified construction and ease of assembly.

Another object of our invention is to provide a panelboard assembly, wherein the load terminal conducting means are secured to a main support frame, and are readily accessible from the rear of the panelboard for connection to an external circuit.

A further object of our invention is to provide a panelboard assembly wherein individual circuit breaker units may be mounted to the front surface of the panelboard, while the load connections to the external circuit are bussed from the rear of the panelboard assembly.

An additional object of our invention is to provide such a panelboard assembly, wherein individual circuit breaker units may be removed from the front portion of the panelboard without disturbing the rear bus work.

Still another object of our invention is to provide a panelboard assembly, wherein the load terminal connections to the external circuits are provided via the rear of the panelboard assembly for easily accesible conducting straps arranged in a neat vertical line.

Still a further object of our invention is to provide a panelboard assembly, wherein the circuit breaker units are electrically connected to the front of the panelboard by individual line and load conducting straps, which serve as the prime means of mechanically supporting the circuit breaker units.

Still an additional object of our invention is to provide such a panelboard assembly, wherein the load conducting strap includes a rearwardly accessible electrical terminal in noninterference relationship with respect to the circuit breaker location, so as to permit a circuit breaker unit to be mounted without disturbing the load bus connections.

Yet another object of our invention is to provide a panelboard assembly having a main frame support member of a generally U-shaped transverse cross-section, the bus means (and line terminal straps forwardly extending therefrom) being mounted to the central body portion of the frame support, and the load terminal straps being mounted to the edges of the frame support forming the arms of the U.

These as well as other objects of this invention will readily become apparent upon a consideration of the following description of the accompanying drawings in which:

FIG. 4 is a cross-sectional view along line 4—4 of FIG. 2 and showing the manner in which a pair of smaller frame circuit breakers may be mounted to our panelboard.

FIG. 5 is a cross-sectional view along line 5—5 of FIG. 2 and similarly showing the manner in which a single circuit breaker of larger frame size may be mounted to our panelboard assembly.

FIG. 6 is a modified embodiment, corresponding to FIG. 4, and utilizing an alternative main frame support configuration.

FIG. 7 is an overall perspective view, from the rear, showing a panelboard assembly in accordance with our invention, cabinet mounted in conjunction with a typical bus feed arrangement.

Figure 1:
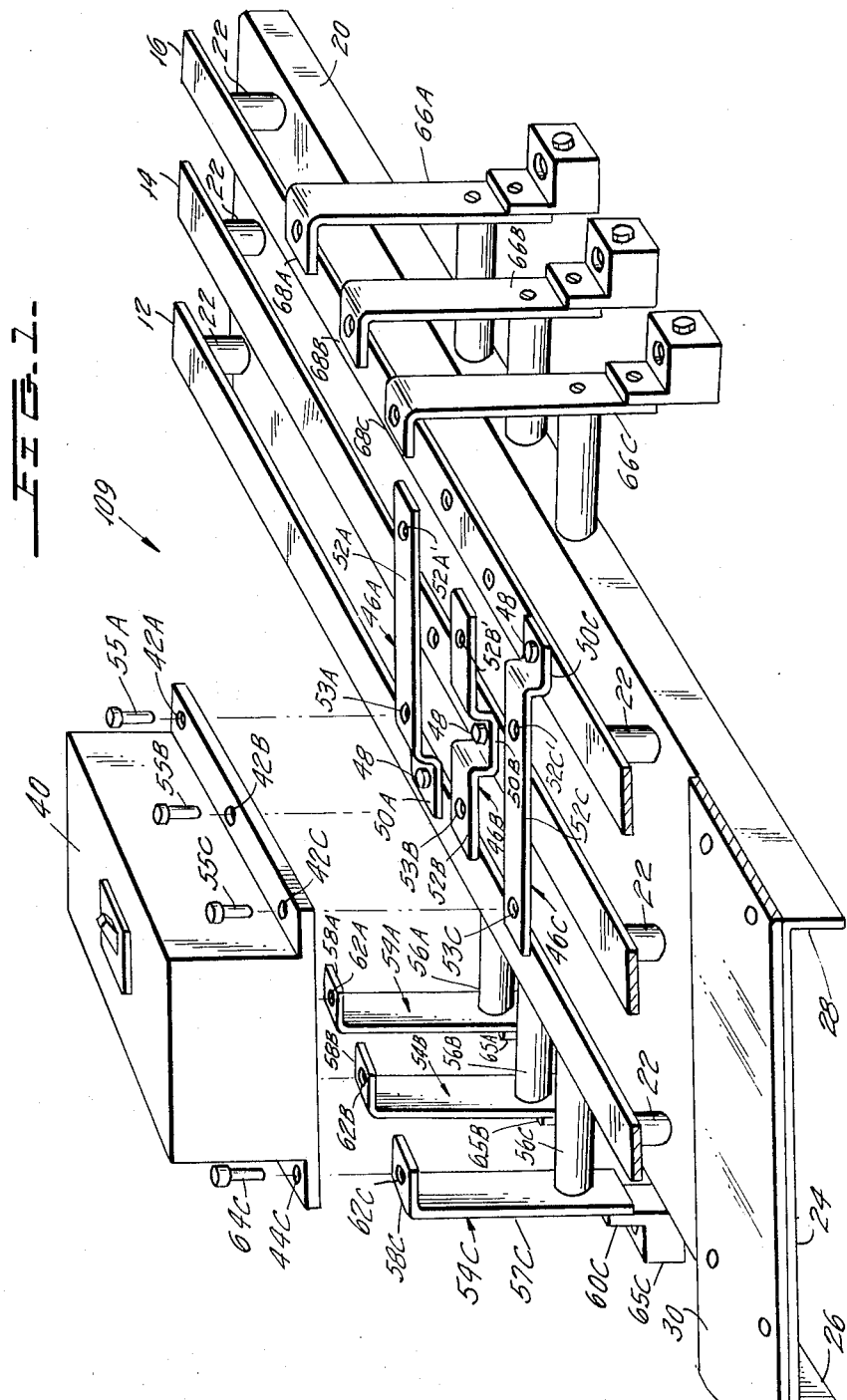
FIG. 1 is an exploded perspective view of a portion of a panelboard assembly constructed in accordance with the basic teachings of our invention.

Referring initially to FIG. 1, panelboard assembly 109 includes bus means 12, 14 and 16, of a typical three-phase bus distribution network. The bus means are in spaced parallel arrangement and are mounted to generally U-shaped frame support 20 by individual support members 22 appropriately spaced along the length of the respective bus means. Support frame 20 is typically shown as an integrally and inexpensive formed steel channel member having a body portion 24 and side flanges 26, 28 respectively. Frame support member 20 is suitably mounted to a structural member (see FIG. 7) as by transverse support 30.

The circuit breaker 40 to be connected to the panelboard assembly is typically shown as being of a frame size permitting a pair of such circuit breakers to be located across the width of the panelboard assembly. Circuit breaker 40 may be a typical three-phase unit of the type shown in U.S. Pat. No. 3,043,939, issued July 10, 1962, to C. E. Gryctko, entitled "Separate Phase Direct Venting," and assigned to the assignee of the instant invention. Circuit breaker 40 contains line terminals 42A, 42B and 42C longitudinally aligned towards the central portion of the panelboard assembly, and longitudinally aligned load terminals along the edge of the panelboard, with load terminal 44C being illustratively shown.

Line terminal straps 46A, 46B, 46C are connected to bus means 12, 14 and 16 respectively, as by a bolted connection 48. Each of the conducting straps includes a portion such as 50A, 50B, 50C, which is connected to its respective bus means, and a forwardly projecting portion such as 52A, 52B, 52C, which is positioned to mate with its respective line terminal of the circuit breaker 40. Tapped apertures are provided in each of the line terminal straps, which will be in registry with the circuit breaker load terminals for bolted securement thereto. Specifically, strap 46A includes an aperture 53A, which will be in alignment with terminal 42A of circuit breaker 40 and is securably mounted thereto by bolt 55A. Similarly, strap 46B contains aperture 53B, which will mate with line terminal 42B of the circuit breaker, while strap 46C contains aperture 53C to mate with line terminal 42C of the circuit breaker.

The load terminal connections to the circuit breaker are in accordance with the novel aspects of our invention, provided by load terminal straps 54A, 54B, and 54C respectively. Referring for example to load strap 54C, it is rigidly mounted to flange 26 of the main support frame 20 by post insulator 56C. Strap 54C includes a main body portion 57C, a forwardly extending portion 58C and a rearwardly extending portion 60C. Forwardly extending portion 58C is provided with aperture 62C, which mates with line terminal 44C of circuit breaker 40 so as to permit firm electrical and mechanical securement thereto, as by bolt 64C. The rearwardly extending portion 60C of the load strap includes a suitable means for interconnection to the load bus, such as lug terminal 65C. The other two phases of the circuit breaker load conductors are similarly bussed to the rear of the panelboard assembly 10, by corresponding components designated with "B" and "C" postscripts respectively.

It is to be specifically noted at this point that the circuit breaker 40 is mounted to the front surface of the panelboard assembly 109 by placing it in alignment with respect to the apertures 53A, 53B, 53C and 62A, 62B, 62C of its respective line and load terminals, with such circuit breaker installation being in non-interference relationship with respect to the load bus connections made to rearwardly positioned lug terminals 65A, 65B, 65C. Likewise, it should be appreciated that lug terminal 65C will be easily accessible from the rear of the panelboard unit when completely assembled, thereby facilitating ease of load bus connections.

The forwardly extending portions of the line conducting straps 46A, 46B, 46C are preferably planar and are positioned substantially parallel to the rear surface of circuit breaker 40. The forward surfaces of the load bus conducting straps include similar planar portions 58A, 58B, 58C respectively. When the circuit breaker unit 40 is installed to the panelboard assembly, the rear surface thereof will firmly rest on these planar portions of the respective line and load conducting straps, such that the conducting straps may furnish the prime, if not the full means of mechanical support, for the circuit breaker unit. This advantageously avoids a variety complex of auxiliary supporting blocks and bracket extensions which had heretofore been thought necessary for rigidly mounting the circuit breaker unit to the panelboard assembly.

The line terminal conducting straps also include tapped apertures 52A', 52B' and 52C' in longitudinal alignment to the right of the line terminals of circuit breaker 40, as shown in FIG. 1. These line terminals are positioned to mate with the line terminals of a circuit breaker unit (not shown), which may be positioned laterally adjacent circuit breaker unit 40, with load conducting straps 66A, 66B, and 66C having longitudinally aligned apertures 68A, 68B, 68C for receiving the load terminals of such a circuit breaker pair, in the same preferable manner as circuit breaker 40 is mounted.

Reference is now made to FIGS. 2–5, which show a portion of a panelboard assembly constructed in accordance with the basic concept of FIG. 1 and wherein components of like function have been given corresponding numerical designations. The load conducting straps 54A, 54B and 54C which are connected at their forwardly projecting portion to the load terminals of circuit breaker 40 are readily shown in FIG. 3 as being externally accessible from the rear surface of the panelboards. Similarly, the load conducting straps of adjacent circuit breaker units are shown by 54', 54'' and 54''' numerical designations as extending vertically upwards from the load conducting straps of circuit breaker unit 40. Likewise, at the other side of the panelboard the load conducting straps 66A, 66B and 66C which connect to the load terminals of circuit breaker pair 40' (as shown in FIG. 4) are similarly accessible from the rear portion of the panelboard assembly, with the load terminals of adjacently arrayed circuit breaker units mounted to the panelboard assembly being similarly shown by 66', 66'' and 66''' designations.

Figure 3:
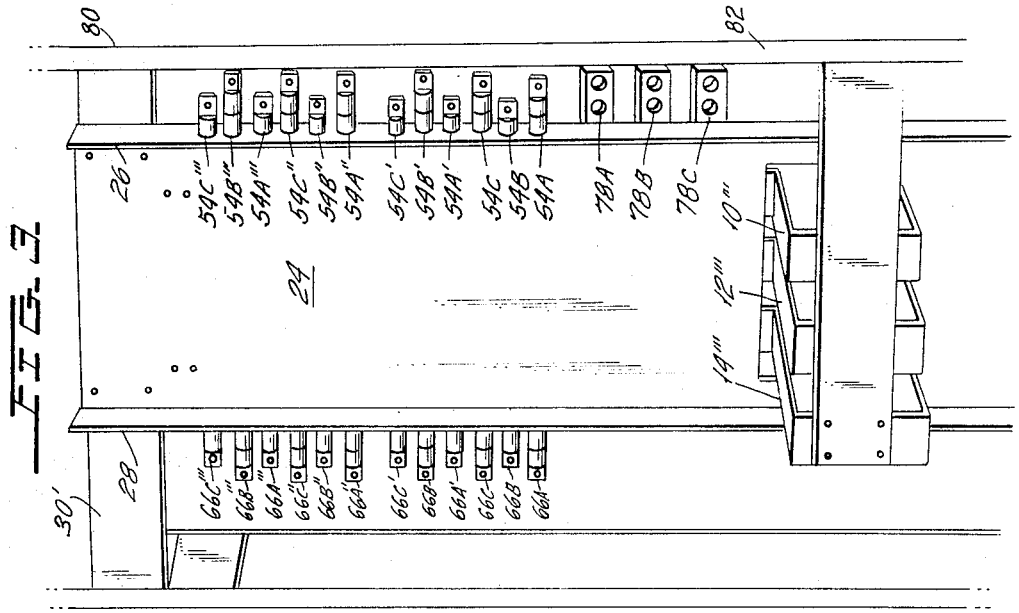
FIG. 3 is a rear view of the panelboard assembly shown in FIG. 1.
Figure 2:
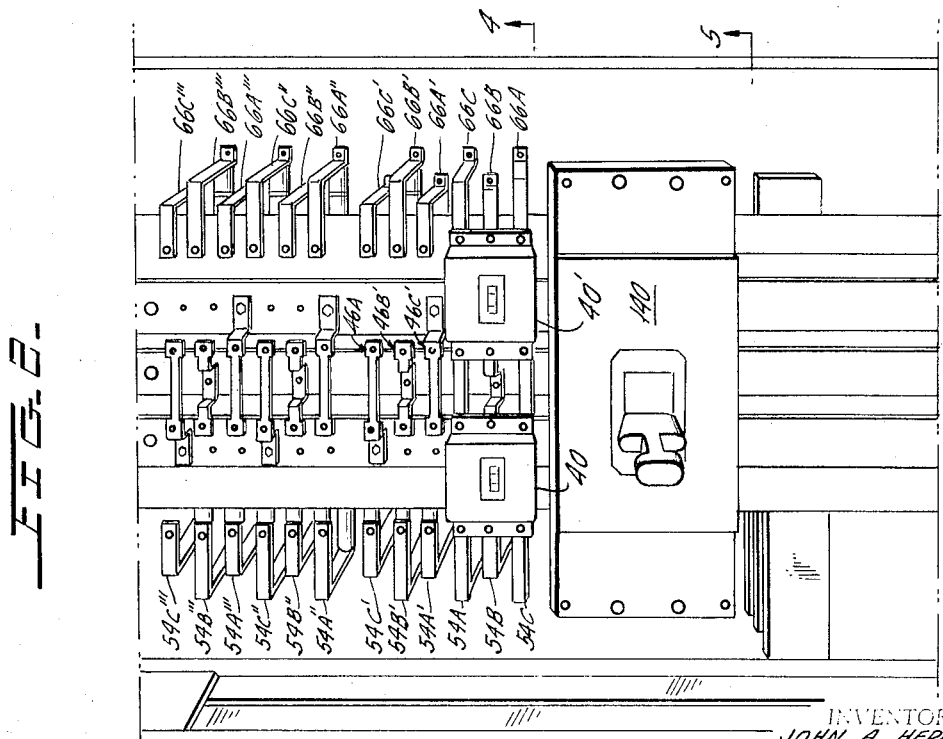
FIG. 2 is a front view of a panelboard in accordance with our invention and showing circuit breakers of different frame size at different portions of the assembly.

A larger frame size circuit breaker 140 which extends substantially across the entire width of the panelboard assembly is also shown mounted, with circuit breaker 140 typically being of the type shown in U.S. Pat. No. 2,648,-742, entitled "Arc Chute Plate," to W. H. Edmunds, issued August 11, 1953, and assigned to the assignee of the instant invention. The line terminals 71 of circuit breaker 140 are interconnected to bus conductors 12, 14, 16 respectively, as by conducting straps 70A, 70B, 70C, with their interconnection to the circuit breaker load terminals being in the manner best shown in cross-sectional view of FIG. 5. Line conductor 70 includes a forwardly extending portion 77, having an aperture 79 to mate with line terminal 71. The load terminals 73 of circuit breaker 140 are connected to load terminal conductor strap such as 70'. Strap 70' is mounted to flange 26 by the main support frame by insulator post 58, as in the manner corresponding to the mountings of load terminal straps 54 and 66 of the smaller size frame. Note similarly that load conducting strap 70' includes a forwardly extending portion 72, having an aperture 74 to mate with the circuit breaker load terminal 73. Load terminal strap 70' includes a rearwardly positioned load bus connecting lug 78, which is readily accessible from the rear of the panelboard assembly, as is shown in FIG. 3. Hence, it is seen that the larger frame circuit breaker 140 similarly mounts to the front of the panelboard assembly, with the connections to the load bus being made from the rear of the panelboard assembly and permitting removal of the circuit breaker unit without disturbing the rear bus work.

Forwardly extending portions 72 and 77 have a planar disposition to form a mounting support for the load and line sides of the circuit breaker unit. To further assist in supporting the larger frame circuit breaker unit such as 140, an auxiliary support bracket 80 may be secured to side flange 28 of the main frame support, with bracket support 80 having a forwardly positioned planar portion 82 to firmly seat the underside of the circuit breaker unit.

Reference is now made to FIG. 6, which shows a somewhat modified form of our invention, wherein the frame support 30' includes longitudinally extending side channels 26', 28' respectively, joined together by a cross member 24. Such a frame support member gives a somewhat more rigid structure, and in some applications the slight additional expense which it entails may be justified by the weight which must be supported. In all other essential aspects the embodiment of FIG. 6 conforms with that discussed above, and it is not believed that a detailed description thereof is necessary.

Reference is now made to FIG. 7, which shows panelboard 10 installed within cabinet member 100, adjacent cabinet member 200, with the latter cabinet member serving as the distribution source of electrical energization. Vertical risers 10', 12', 14' connected to a suitable source of electrical current are connected to the line terminals of main breakers 210, 212, 214 respectively, with the load terminals of these breakers then connected to distribution bus 10'', 12'', 14''. Bus 10'', 12'', 14'' horizontally pass through aperture 210 to cabinet 100, wherein they terminate at connecting bus 10''', 12''', 14''', which serve as the line feed to longitudinal bus 12, 14, 16 respectively. It is also seen in this figure that transverse support members 30 of the panelboard assembly are suitably interconnected into the end walls 102, 104 of cabinet 100 for mounting the panelboard assembly 10 as a unit. As shown in this figure, it can be readily appreciated that the extreme accessibility of the load conductors 54A, 54B, 54C, etc.; 66A, 66B, 66C etc. and 78A', 78B', 78C' along a neat vertical line, unobstructed by other components, facilitates the load bus connections. These may be made by vertical cables or copper bars (not shown) positioned intermediate flange 26 and cabinet wall 104 on one side and flange 28 and cabinet wall 102 on the other side, with such cables then upwardly extending through cabinet top opening 106 for interconnection to the various external circuits.

It is therefore seen that our invention provides a substantially simplified panelboard assembly, permitting ease of circuit breaker installation and load bus connections.

Although in the foregoing specification this invention has been described in accordance with preferred embodiments, many variations and modifications will now become apparent to those skilled in the art, and it is therefore preferred that the instant invention be limited not by the specific disclosure contained herein but only by the appended claims.

The embodiments of the invention in which an exclusive privilege or property is claimed are defined as follows:

1. The combination of a panelboard assembly and at least one circuit breaker mounted thereto; said panelboard extending in a longitudinal direction, and said circuit breaker mounted transverse to said longitudinal direction, at a predetermined position along the length of said panelboard; said circuit breaker having space-separated line and load terminals; said line terminals of said circuit breaker located in a first row, extending in said longitudinal direction; said load terminals of said circuit breaker located in a second row, extending in said longitudinal direction; said panelboard comprising a plurality of bus means, extending in said longitudinal direction; first conducting means for electrically connecting said line terminals to said bus means, and second conducting means for electrically connecting said load terminals to an external circuit; said first conducting means including a first portion forwardly extending from said bus means, and a second portion secured to said bus means; said first portion including first circuit breaker terminal connecting means, positioned along said first row for receiving said line terminals; said second conducting means including a forwardly extending first portion, and a rearwardly extending second portion; said first portion including second circuit breaker terminal connecting means positioned along said second row for receiving said load terminals; said first portions of said first and second conducting means forwardly accessible for mounting and removal of said circuit breaker; said second portions of said second conducting means rearwardly accessible, in non-interference relationship, with said circuit breaker, whereby said circuit breaker may be removed while the second portion of said second conducting means remains connected to an external circuit; a frame support, longitudinally extending substantially the entire length of said panelboard; first support members rigidly mounting said bus means to said frame support; second support members rigidly mounting said second conducting means to said frame support; individual ones of said first and second conducting means in transverse alignment to define a desired number of circuit breaker terminal locations, adapted to receive individual sets of said line and load terminals; said frame support having a generally U-shaped cross-section, including a central portion and side flanges; said first support members including insulator posts forwardly extending from said central portion; said second support members including an individual insulator post sidewardly extending from at least one of said side flanges at each of said circuit breaker terminal locations for each of said second conducting means; said second conducting means having a body portion, secured to its respective insulator post; said body portion joining its respective first and second portions.

2. The combination of claim 1 wherein said circuit breaker transversely extends substantially the entire width of said frame support; said second conducting means mounted along one of said side flanges; said forwardly extending portion of said first and second means including planar portions substantially parallel to said bus means; a support bracket mounted to the other of said side flanges and including a forwardly extending planar portion; said planar portions abutting the rear surface of said circuit breaker to define the sole mechanical support means therefor.

3. The combination of a panelboard assembly and at least a first and second circuit breaker mounted thereto; said panelboard extending in a longitudinal direction, and said circuit breakers mounted transverse to said longitudinal direction, at a predetermined position along the length of said panelboard; said first and second circuit breakers laterally adjacent in end-to-end relationship to define a pair of circuit breakers across the width of said panelboard; each of said circuit breakers having space-separated line and load terminals; said line terminals of said first and second circuit breakers located in first and third rows, respectively, extending in said longitudinal direction; said load terminals of said first and second circuit breakers located in second and fourth rows, respectively, extending in said longitudinal direction; said panelboard comprising a plurality of bus means, extending in said longitudinal direction; first conducting means for electrically connecting said line terminals to said bus means, and second conducting means for electrically connecting said load terminals to respective external circuits; said first conducting means including a first portion forwardly extending from said bus means, and a second portion secured to said bus means; said first portion including terminal connecting means, positioned along said first and third rows for independently receiving said line terminals of said first and second circuit breakers; said second conducting means including a forwardly extending first portion, and a rearwardly extending second portion; said first portion including circuit breaker terminal connecting means positioned along said second and fourth rows, for independently receiving said load terminals of said first and second circuit breaker; said first portions of said first and second conudcting means forwardly accessible for mounting and removal of said circuit breakers; said second portions of said second conducting means rearwardly accessible, in non-interference relationship, with said circuit breakers, whereby said circuit breakers may be removed while the second portion of said second conducting means remains connected to their respective external circuits; a frame support, longitudinally extending substantially the entire length of said panelboard; first support members rigidly mounting said bus means to said frame support; second support members rigidly mounting said second conducting means to said frame support; individual ones of said first and second conducting means in transverse alignment to define a desired number of circuit breaker terminal locations, adapted to receive individual sets of said line and load terminals; each of said circuit breaker terminal locations having laterally aligned terminal connecting means in said first, second, third and fourth rows; said frame support having a generally U-shaped cross-section, including a central portion and side flanges; said first support members including insulator posts forwardly extending from said central portions; said second support members including an individual insulator post sidewardly extending from said side flanges at each of said circuit breaker terminal locations for each of said second conducting means; said second conducting means having a body portion, secured to its respective insulator post; said body portion joining its respective first and second portions; said first and second circuit breaker load terminals connected to independent external circuitry via independent second conducting means mounted to respective ones of said side flanges at its respective terminal location.

4. The combination as claimed in claim 3, wherein said forwardly extending portions of said first and second conducting means include planar portions; said planar portions abutting the rear of said first and second circuit breakers to define the sole mechanical support for said circuit breakers.

5. A panelboard assembly comprising a plurality of longitudinally extending bus means; a frame support having a front and rear surface; support members rigidly securing said bus means along said front surface; first conducting means for electrically connecting a first group of circuit breaker terminals to said bus means; said first conducting means including a first portion forwardly projecting from said bus means and a second portion secured to said bus means; said first portion readily accessible from the front of the panelboard assembly; second conducting means for electrically connecting a second group of circuit breaker terminals to respective external circuits; support means rigidly securing said second conducting means to said frame support, electrically insulated from said bus means; said second conducting means including a forwardly projecting first portion, readily accessible from the front of the panelboard assembly, and a rearwardly projecting second portion readily accessible from the rear of the panelboard assembly for connection to respective external circuits; said second conducting means positioned to permit independent electrical connection and disconnection of said first and second portions; said frame support having a generally U-shaped cross-section, including a central portion and side flanges; said support members including insulator posts forwardly extending from said central portion; said support means including an individual insulator post sidewardly extending from at least one of said side flanges at each of said circuit breaker terminal locations for each of said second conducting means; said second conducting means having a body portion, secured to its respective insulator post; said body portion joining its respective first and second portions.

6. A panelboard assembly comprising a plurality of longitudinally extending bus means; a frame support having a front and rear surface; support members rigidly securing said bus means along said front surface; first conducting means for electrically connecting a first group of circuit breaker terminals to said bus means; said first conducting means including a first portion forwardly projecting from said bus means and a second portion secured to said bus means; said first portion readily accessible from the front of the panelboard assembly; second conducting means for electrically connecting a second group of circuit breaker terminals to respective external circuits; support means rigidly securing said second conducting means to said frame support, electrically insulated from said bus means; said second conducting means including a forwardly projecting first portion, readily accessible from the front of the panelboard assembly, and a rearwardly projecting second portion readily accessible from the rear of the panelboard assembly for connection to respective external circuits; said second conducting means positioned to permit independent electrical connection and disconnection of said first and second portions; said first and second conducting means defining a desired number of adjacently positioned circuit breaker terminal locations; each of said locations including an individual first and second conducting means in transverse alignment; each of said forwardly projecting portions including terminal connecting means; the terminal connecting means of said first conducting means in longitudinal alignment along a first row, and the terminal connecting means of said second conducting means in longitudinal alignment along a second row; said first and second rows extending substantially parallel, and space separated a distance corresponding to the line and load terminals of circuit breaker units to be received; said frame support having a generally U-shaped cross-section, including a central portion and side flanges; said first support members including insulator posts forwardly extending from said central portion; said second support members including an individual insulator post sidewardly extending from said side flanges at each of said circuit breaker terminal locations for each of said second conducting means; said second conducting means having a body portion, secured to its respective insulator post; said body portion joining its respective first and second portions.

References Cited by the Examiner
UNITED STATES PATENTS

| | | | |
|---|---|---|---|
| 2,735,043 | 2/1956 | Speck | 317—119 |
| 2,824,934 | 2/1958 | Jones | 200—168 X |
| 2,986,676 | 5/1961 | Edmunds | 317—119 |
| 3,164,752 | 1/1965 | Koenig | 317—120 X |
| 3,204,150 | 8/1965 | Gauthier | 317—119 |

ROBERT K. SCHAEFER, *Primary Examiner.*

KATHLEEN H. CLAFFY, *Examiner.*

W. C. GARVERT, *Assistant Examiner.*